Sept. 2, 1941.  G. W. NORRICK ET AL  2,254,442
SUCTION NOZZLE
Filed Jan. 12, 1940
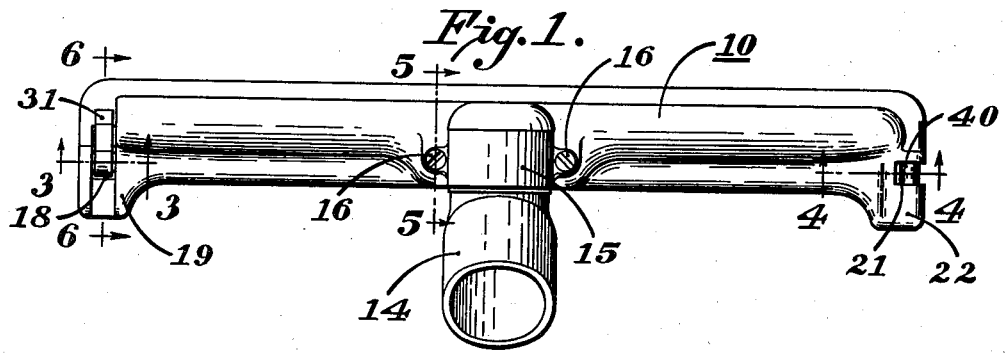
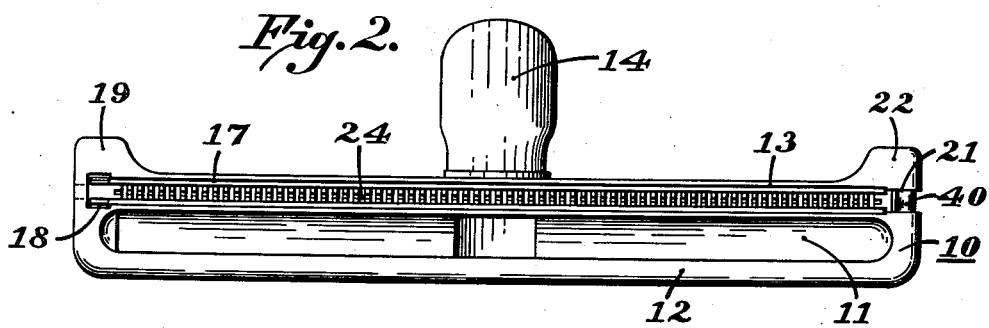
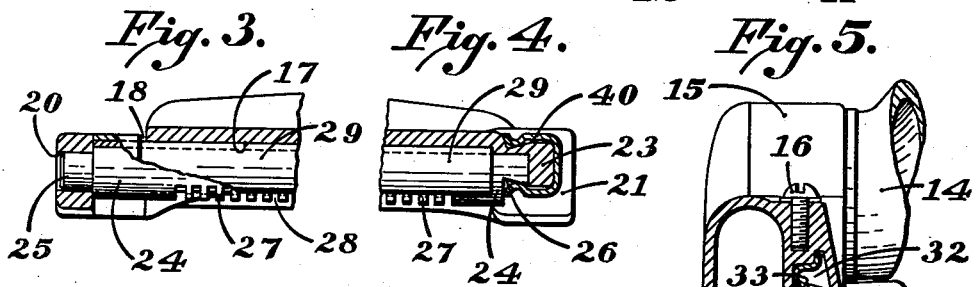
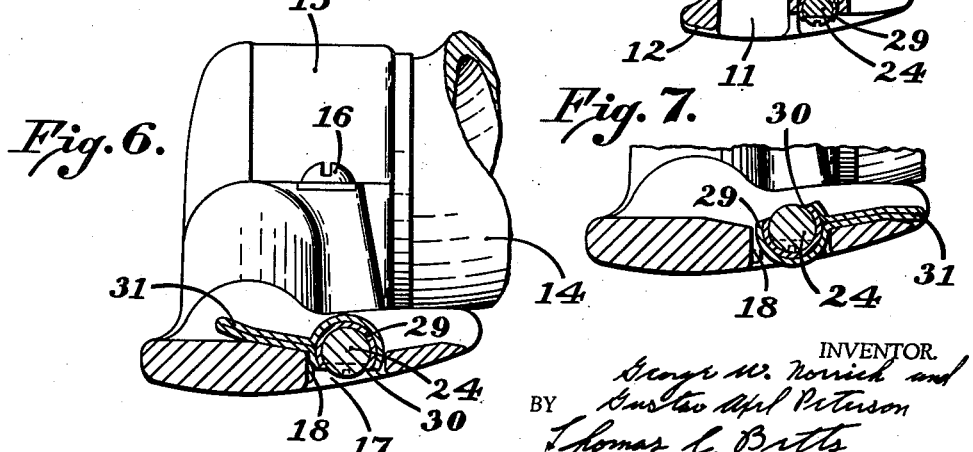
INVENTOR.
George W. Norrick and
BY Gustav Axel Peterson
Thomas C. Britts
their ATTORNEY.

Patented Sept. 2, 1941

2,254,442

UNITED STATES PATENT OFFICE 2,254,442

SUCTION NOZZLE

George W. Norrick, New Canaan, and Gustav Axel Peterson, Stamford, Conn., assignors to Electrolux Corporation, Dover, Del., a corporation of Delaware Application January 12, 1940, Serial No. 313,522

5 Claims. (Cl. 15—157)

Our invention relates to vacuum cleaners and more particularly to suction nozzles therefor of the type wherein the nature of one or more of the surface-contacting lips of the nozzle may be altered at the will of the operator.

Among the objects of our invention is the provision of simple but sturdy means for securing a surface-contacting member in place in the nozzle lip without employing bolts, screws, rivets or other fastening means which require tools for their manipulation.

Another object of our invention is to provide an improved arrangement for altering the character of the surface-contacting face.

Further objects and advantages of our invention will be apparent from the following description, considered in connection with the accompanying drawing, which forms part of this specification and of which:

Fig. 1 is a top view of a nozzle in accordance with our invention;

Fig. 2 is a bottom view of the nozzle shown in Fig. 1;

Fig. 3 is a cross-sectional view, on a somewhat enlarged scale, taken on the line 3—3 of Fig. 1;

Fig. 4 is a similar view taken on the line 4—4 of Fig. 1;

Fig. 5 is a view on an enlarged scale taken on the line 5—5 of Fig. 1;

Fig. 6 is a view on an enlarged scale taken on the line 6—6 of Fig. 1; and

Fig. 7 is a cross-sectional view of a portion of the device shown in Fig. 6, but with certain parts in a different position.

Referring to the drawing, reference character 10 designates generally a hollow elongated body which is open at the bottom to provide an elongated suction slot 11. The lower edges of the side walls of the body provide surface-contacting lips 12 and 13. A hollow handle connection member 14 is preferably rotatably secured to the body 10 by means of a semi-circular strap 15 held in place by bolts 16.

Rear lip 13 of the nozzle is formed with a groove 17 which extends throughout substantially the entire length of the lip. At one end of the nozzle, the groove terminates in a slot 18 which extends vertically through a wing portion 19 of the body 10. The nozzle body is formed with a bore 20 in alignment with groove 17, and on the opposite side of slot 18 from the groove.

The other end of the groove terminates in a slot 21 which extends vertically through a wing portion 22. This slot also is open to the end of the nozzle body. Slot 21 is bridged by a member 23 which may be integral with the nozzle, particularly if the body is a casting, or it may be a separate piece secured within the slot.

A cylindrical rod 24 is formed with an end 25 of reduced diameter so as to be receivable within the bore 20. The length of the rod is such that, when the end 25 is received in the bore, the other end of the rod is closely adjacent to the member 23. The fit between the bore 20 and the end 25 is made with sufficient play so that the end may be inserted in the bore even though their axes are out of alignment sufficiently to permit the opposite end of the rod to be below the member 23.

The end of rod 24 opposite to the end 25 is formed with a flat and angularly undercut face 26. A resilient clip member 40 having a general U-shape, as is clearly shown in Fig. 4, is adapted to engage the face 26 of the rod and the member 23 to hold the rod securely in place within the groove 17. The flat face 26 prevents rotation of the rod, and due to the inclined surface of the undercut face the clip 40 is prevented from becoming loosened and slipping from position.

Rod 24 is formed with a plurality of teeth 27 separated by grooves 28. The angular relationship of the teeth and the face 26 is such that the teeth always face downwardly.

Rotatably mounted on the rod 24 is a sleeve 29 formed with a longitudinally extending slot 30. Secured to the end of sleeve 29 which extends into slot 18 is a handle member 31 which may be turned within the slot in order to rotate the sleeve about the rod 24. As shown, the handle member 31 is in the form of a strip of metal, portions of which are pressed together to form the handle, while other portions extend around the sleeve and are secured thereto in any suitable manner, such as by welding.

As is shown in Fig. 5, the nozzle body is formed with a recess 32 communicating with the slot 17 and a resilient member 33 is disposed in this recess so as to bear against the outer surface of the sleeve 29. The purpose of this is to impose a frictional resistance to turning of the sleeve so that it will not be turned accidentally. However, this resistance is insufficient to interfere in any substantial degree with the turning of the sleeve by the handle 31.

In assembling the above-described nozzle, the resilient member 33 is placed in the recess 32 and the sleeve 29, to which has been attached the handle 31, is telescoped over the rod 24 until the outer end of the reduced portion 25 is flush with, or within the sleeve. The sleeve is turned with respect to the rod so that the handle occupies a position intermediate to that shown in Figs. 6 and 7, that is, the handle extends vertically upwardly. With the sleeve and rod in this position, they are placed in the groove 17 with the handle 31 extending upwardly through the slot 18. The opposite end of the rod will then extend below the member 23. The rod is then slid to the left, as viewed in Figs. 3 or 4, the reduced end 25 entering the bore 20, until the opposite end clears the member 23, whereupon it may be moved upwardly to occupy the position shown in Fig. 4. The resilient clip 40 is then forced over the member 23 and engages the face 26 on the rod, thus holding the rod and sleeve securely in place within the groove 17.

The sleeve 29 may then be rotated on the rod 24 so as to either expose the teeth 27 and grooves 28, thus providing the lip 13 with a serrated face for contacting the surface to be cleaned, or the sleeve may be rotated to the position shown in Fig. 7 where it covers the lower surface of the rod and provides the lip with a smooth surface-contacting face.

With the parts in the position shown in Fig. 6, that is, with the teeth and grooves exposed, the teeth serve to agitate objects, such as threads, lint or the like, which tend to adhere to a rug, and the air flowing along the surface of the rug through the grooves 28 is able to pick up these objects and carry them into the nozzle. Thus, under these conditions, the nozzle is well adapted to remove surface dirt. With the parts in the position shown in Fig. 7, on the other hand, the smooth surface of the lip permits but little air to flow thereunder, and most of the air is forced to flow through the rug in order to enter the nozzle, and thus serves to remove dirt imbedded in the rug.

It will hence be seen that we have provided a lip structure for a nozzle which may be rapidly assembled without requiring the use of any tools, and which likewise may be readily disassembled if it is desired for any reason to remove the rod and sleeve. While we have shown one more or less specific embodiment of our invention, it is to be understood that this has been done for purposes of illustration only, and is not to be considered as limiting the scope of our invention, which is to be determined by the appended claims.

What we claim is:

1. In a suction nozzle, a hollow body having lips defining a suction opening, one of said lips being formed with a groove, said body having a bore in alignment with one end of said groove, a rod having a surface-contacting face disposed in said groove with one end thereof received in said bore, and a generally U-shaped spring clip member engaging the other end of said rod and resiliently embracing said body for securing said rod in place within the groove, the arms of said member extending substantially parallel to said rod.

2. In a suction nozzle, a hollow body having lips defining a suction opening, one of said lips being formed with a groove, said body having a bore in alignment with one end of said groove and with a slot at the other end of the groove, a member extending across said slot, a rod having a surface-contacting face disposed in said groove with one end thereof extending into said bore and the other end adjacent to said member, and a removable resilient clamp having arms extending substantially parallel to said rod and embracing said member and engaging said other end for securing said rod in place.

3. In vacuum cleaner nozzle, a body having spaced walls defining a suction opening, the lower edges of said walls forming surface-contacting lips, one of the lips having a groove formed in the face thereof, said body having a slot therein at each end of said groove, and having a bore in alignment with said groove and on the opposite side of one of said slots from said groove, a rod having a surface-contacting face disposed in said groove with one end thereof extending into said bore, a slotted sleeve turnably mounted on said rod, an arm secured to said sleeve and turnable within the slot adjacent to said bore, a member bridging the other slot, and a U-shaped element for fastening the adjacent end of said rod to said member to thereby secure said rod and said sleeve in said groove.

4. In vacuum cleaner nozzle, a body having spaced walls defining a suction opening, the lower edges of said walls forming surface-contacting lips, one of the lips having a groove formed in the face thereof, a rod secured in said groove, a slotted sleeve rotatably mounted on said rod, a handle secured to said sleeve for rotating the latter, said body being formed with a recess opening from said groove, and a resilient member disposed in said recess and bearing against said sleeve to impose a frictional resistance to rotation thereof.

5. In a suction nozzle, a hollow body having lips defining a suction opening, one of said lips being formed with a groove, said body having a bore in alignment with one end of said groove, a rod having a surface-contacting face disposed in said groove with one end thereof received in said bore, the opposite end of said rod being formed with an undercut flat surface, and a substantially U-shaped resilient clip member engaging said flat surface and resiliently embracing said body for securing said rod in place.

GEORGE W. NORRICK.
GUSTAV AXEL PETERSON.